United States Patent
Teshima

(10) Patent No.: US 8,049,912 B2
(45) Date of Patent: Nov. 1, 2011

(54) IMAGE PROCESSING SYSTEM, IMAGE PROCESSING PROGRAM AND IMAGE PROCESSING METHOD

(75) Inventor: Katsunori Teshima, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1166 days.

(21) Appl. No.: 11/812,944

(22) Filed: Jun. 22, 2007

(65) Prior Publication Data

US 2008/0013121 A1 Jan. 17, 2008

(30) Foreign Application Priority Data

Jul. 13, 2006 (JP) ................... 2006-192612

(51) Int. Cl.
*G06F 15/00* (2006.01)
*G06K 9/00* (2006.01)
(52) U.S. Cl. ...................... 358/1.14; 382/100
(58) Field of Classification Search .......... 358/1.14, 358/1.15, 1.13, 1.16, 1.18, 3.28, 1.9, 474, 358/449, 471; 382/100, 128, 280; 271/10.11, 271/22; 399/363, 18, 208, 214, 210, 79
See application file for complete search history.

(56) References Cited

U.S. PATENT DOCUMENTS

2006/0015756 A1 * 1/2006 Chrisop et al. ............... 713/193

FOREIGN PATENT DOCUMENTS

| JP | 10-200677 | 7/1998 |
| JP | 2000-36889 | 2/2000 |
| JP | 2005-340899 | 12/2005 |

OTHER PUBLICATIONS

Office Action dated Sep. 8, 2010 corresponding to Japanese Application No. 2006-192612.

* cited by examiner

*Primary Examiner* — Saeid Ebrahimi Dehkordy
(74) *Attorney, Agent, or Firm* — Finnegan, Henderson, Farabow, Garrett & Dunner, L.L.P.

(57) ABSTRACT

An image processing system having a reading section which reads a document image to obtain an image data, an impact detecting section to detect an impact, an identifying section which identifies an image data obtained by reading the document image using the reading section upon receiving an impact, when the impact is detected by the impact detecting section during a reading operation of the document image using the reading section, and an outputting section which visualizes and outputs the image data identified by the identifying section for an operator.

20 Claims, 5 Drawing Sheets

IMAGE PROCESSING SYSTEM, IMAGE PROCESSING PROGRAM AND IMAGE PROCESSING METHOD

CROSS REFERENCE TO RELATED APPLICATION

The present application is based on Japanese Patent Application No. 2006-192612 filed with Japan Patent Office on Jul. 13, 2006, the entire content of which is hereby incorporated by reference.

BACKGROUND OF THE INVENTION

1. Technical Field

The present invention relates to image processing systems, programs and methods having reading section for reading a document image to obtain an image data.

2. Description of Related Art

Image forming apparatuses (image processing systems) such as copying machines used in offices and the like, read document images using a scanner (reading section), and form the read images on sheets as an output. In homes, a scanner connected with a personal computer (PC) is used, for example, for reading document images such as printed photographs, and editing the read image on the PC. In addition, image data obtained by reading document images using the scanner in the image forming apparatuses or the scanner connected with the PC are stored in a high-capacity hard disk (HDD). And then, in many cases, the stored image data are, as needed, read out to be visualized and outputted on sheets, or reedited on the PC.

Meanwhile, a reading operation of a document image using a scanner is performed by moving an imaging device, lens, or the like; therefore, a reception of an impact during the reading can disturb the normal reading operation, thus resulting in a failed read image. The same is true for the case when an image is stored in an HDD. That is, a reception of an impact during a storage of an image in the HDD can disturb the normal execution of the storing operation, thus resulting in a failed storage image in the HDD.

Thus, there is proposed a technique of stopping a reading operation or the like upon detecting an impact, for example, on a scanner. Japanese Unexamined Patent Application Publication No. 2000-36889 describes a technique of stopping a scanning operation performed by a film scanner upon detecting an impact. According to the technique described in the above patent, the reading operation is stopped upon receiving an impact, thus causing no unevenness or discontinuity in the resulting read image.

However, such a stop upon receiving an impact as described by the above-mentioned Japanese Unexamined Patent Application Publication No. 2000-36889 temporarily suspends the reading operation, which may be undesirable from a productivity standpoint. For example, in the case of an automatic and continuous reading of a large amount of documents with a scanner, if a series of reading operation stops due to a reception of an impact at an early stage of the operation, most of the documents remain unread when a user, who happens to be absent during the operation, becomes aware of the stop of the operation later, which results in a considerable time loss. In this regard, the same is true for the case when an impact is received during a storing operation in an HDD.

In another respect, a reception of an impact may not cause any failure at all in a reading operation by a scanner or a storing operation in an HDD; therefore it is not preferable to stop a reading operation or the like in all cases alike.

An object of the present invention is to provide image processing systems and programs which, while taking into account the productivity of reading and storing operations, cope with failures upon receiving an impact.

SUMMARY

An image processing system reflecting one aspect of the present invention has: a reading section which reads a document image to obtain an image data; an impact detecting section to detect an impact; an identifying section which identifies an image data obtained by reading the document image using the reading section upon receiving an impact, when the impact is detected by the impact detecting section during a reading operation of the document image using the reading section; and an outputting section which visualizes and outputs the image data identified by the identifying section for an operator.

In the above image processing system, it is preferable that an outputting of the image data by the outputting section is a displaying of the visualized image based on the image data on a display unit.

In the above image processing system, it is also preferable that an outputting of the image data by the outputting section is an outputting by forming the visualized image on a sheet based on the image data.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

Figure 1:
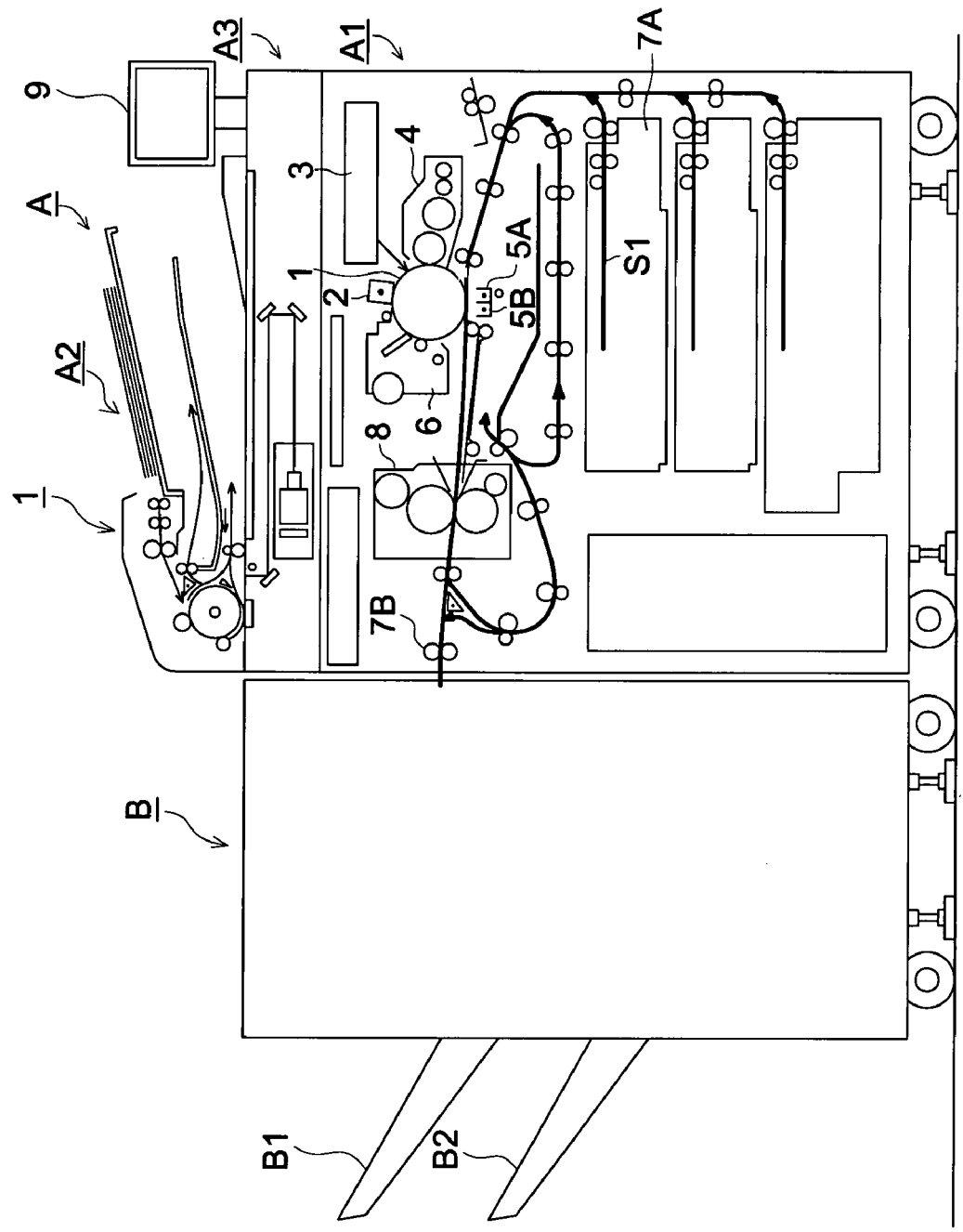
FIG. 1 is a front view of image processing system 1.

FIG. 1 is a front view of an image processing system according to the present invention.

Image processing system 1 comprises main body A and post-processing section B, and can form images on sheets S1.

Main body A has image forming unit A1, document transfer unit A2, and image reading unit A3. A plurality of documents are set at document transfer unit A2, which then continuously transfers them to image reading unit A3, which then reads them.

Around drum-shaped photoreceptor 1 in image forming unit A1 is disposed charging unit 2, exposing unit 3, developing unit 4, transfer unit 5A, separation unit 5B, and cleaning unit 6; where charging, exposing, developing, and transfer processes are conducted to form toner images on sheets S1. The sheets S1 on which the toner images have been formed pass through fixing unit 8 to be fixing processed. The fixing processed sheets S1 are then discharged by discharge roller 7B from main body A.

In addition, main body A is provided with operation display unit (display unit) 9 of a large-size screen (e.g., 15 inch diagonal), in which settings for printing operations performed at image processing system 1 can be specified.

Post-processing section B performs post-processing operations such as bookbinding and stapling to the sheets S1 delivered from main body A. Post-processing section B can collect sheets S1 and output, on a per copy basis, the number of sorted copies set at operation display unit 9, which are then discharged to discharge tray B1 or B2 by switching between transfer passages.

Although the image processing system 1 of the above embodiment forms monochrome images by electrophotography, the image processing system of the present invention is not limited to the above embodiment, but may of course be a color image forming apparatus or may also use any image forming method besides electrophotography.

Figure 2:
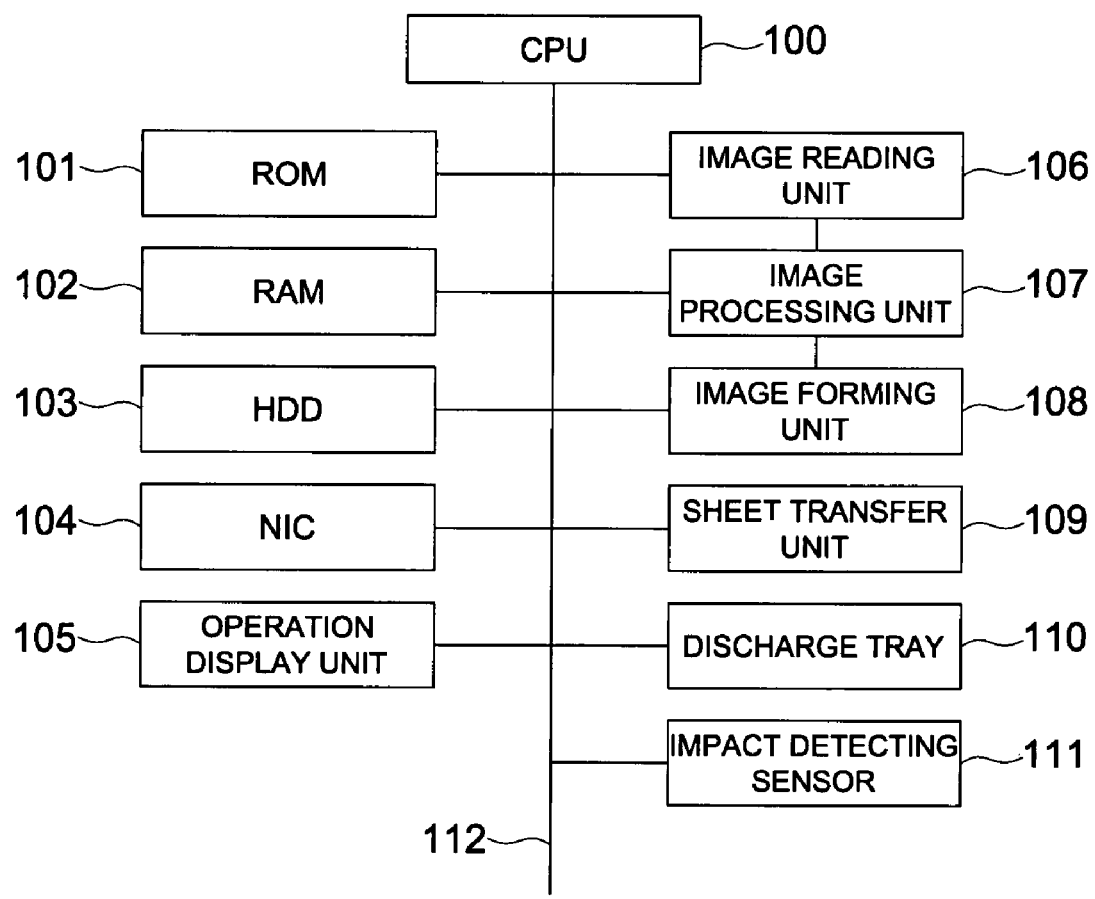
FIG. 2 is a block diagram of a controller configuration for image processing system 1.

FIG. 2 is a block diagram of a controller configuration for image processing system 1 shown in FIG. 1 and illustrates a typical controller configuration.

CPU 100 serving as controlling section controls the entire operation of image processing system 1 and is connected with ROM (Read Only Memory) 101, RAM (Random Access Memory) 102 and the like via system bus 112. CPU 100 reads various controlling programs stored in ROM 101 and expands them on RAM 102 to control the operation of each unit such as HDD 103. In addition, CPU 100 performs various processings according to the programs expanded on RAM 102, and stores the processed results in RAM 102 and displays them on operation display unit 105 as well. And then the processed results stored in RAM 102 are saved into a predetermined storage location.

ROM 101 stores programs, data, and the like beforehand and is composed of a magnetic or optical recording medium, or a semiconductor memory. ROM 101 stores image processing programs of the present invention, according to which predetermined image processing methods are implemented.

RAM 102 provides a work area which temporarily stores, for example, data processed by various controlling programs executed by CPU 100.

HDD 103 serving as storing section has functions such as storing image data obtained by reading document images at image reading unit 106 and storing outputted image data. Structurally an HDD is a stack of equally spaced multiple metal discs coated or deposited with magnetic materials, which is rotated by a motor at a high speed with a magnetic recording head being moved close thereto to read and write data.

Image forming apparatus 1 can communicate with an external terminal through network interface card (NIC) 104, which is an interface between system bus 112 and an external network such as a LAN.

Operation display unit 105 serving as a display unit or outputting section enables various settings, and a user can set detailed printing operations in operation display unit 105. In addition, various items of information such as network setting information are displayed.

Image reading unit 106 serving as reading section optically reads a document image and transforms it to an electrical signal to produce an image data. The image data produced is processed by image processing unit 107 and outputted to image forming unit 108.

Image forming unit 108 forms an image (visible image) on a sheet based on the image data to which various image processings are performed by image processing unit 107.

Sheet transfer unit 109 serving as outputting section transfers the image formed sheet to either discharge tray B1 or B2.

Since sheet transfer unit 109 discharges the sheets on a per copy basis, it collects the sheets at an upstream of the transfer direction for either discharge tray B1 or B2, and when it has collected one copy of the sheets, discharges them to the corresponding tray on a per copy basis.

Impact detecting sensor 111 serving as impact detecting section detects an impact received by HDD 103 or image reading unit 106. A method for detecting an impact includes, for example, detection of a current produced by a strain of a piezoelectric device upon receiving an impact and detection with an acceleration sensor.

Figure 3:
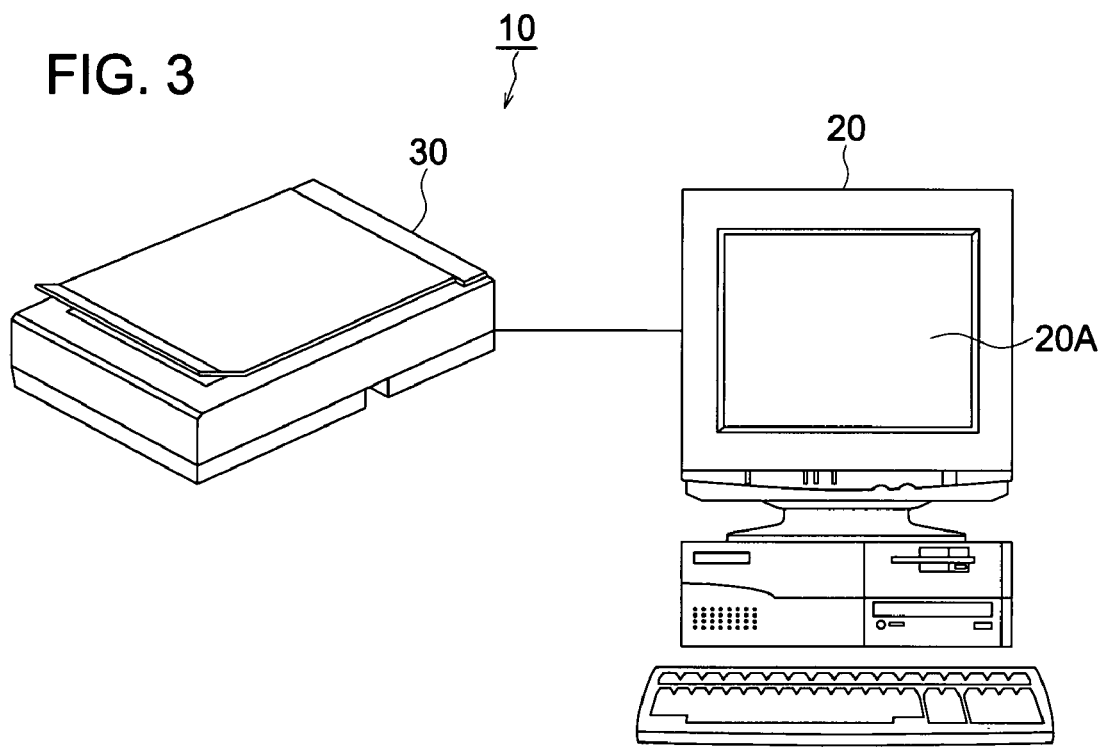
FIG. 3 illustrates image processing system 10 with scanner unit 20 connected with PC 10.

FIG. 3 illustrates image processing system 10 with scanner unit 20 connected with PC 10.

Image processing system 10 shown in FIG. 3, which is different from the image processing system shown in FIGS. 1 and 2, is another embodiment of the invention, in which a document is set at scanner unit 30 to read the document image. An image data obtained by reading the document image with scanner unit 30 is fed into PC 10 connected with scanner unit 30 to be, for example, displayed on display 20A serving as a display unit or outputting section, or edited using the hardware and applications of PC 10. Although, in scanner unit 30 of FIG. 3, one document is set at a time for performing the reading operation, a module for continuously transferring a plurality of documents, such as document transfer unit A2 of image processing system 1 shown in FIG. 1, may be attached to the upper portion of scanner unit 30. This enables a plurality of documents to be read continuously at scanner unit 30.

Figure 4:
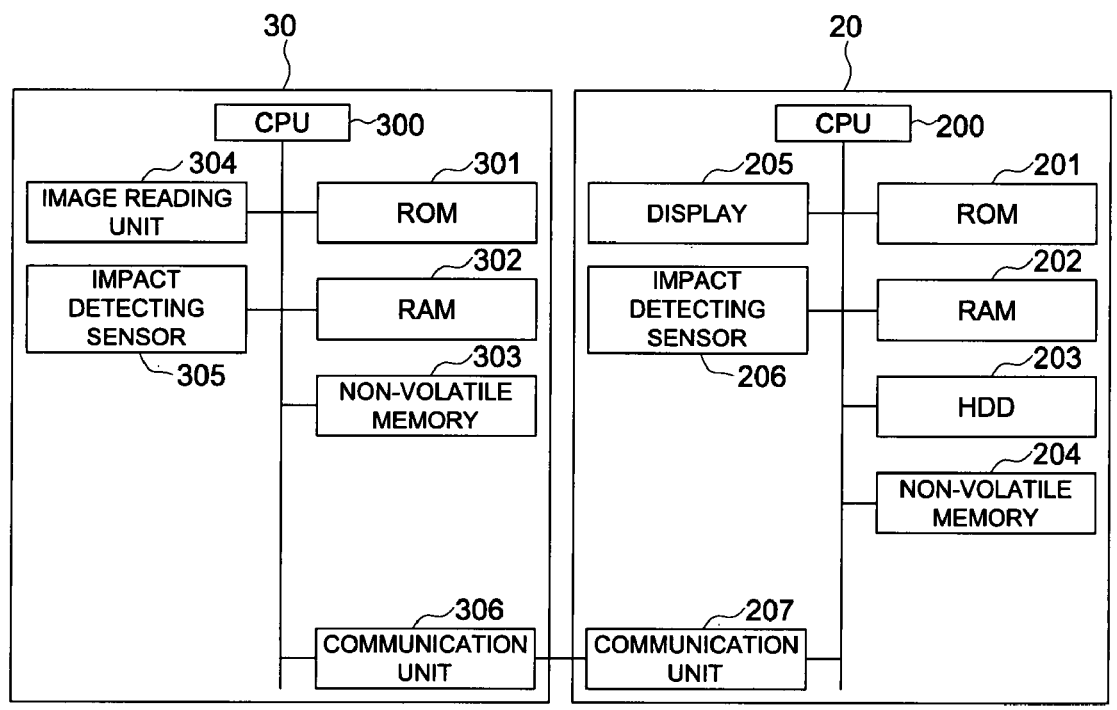
FIG. 4 is a block diagram of a controller configuration for image processing system 10.

FIG. 4 is a block diagram of a controller configuration for image processing system 10 shown in FIG. 3, and illustrates a typical controller configuration.

PC 20 and scanner unit 30 have CPU 200 and CPU 300 respectively, which control the operation of each unit of PC 20 and scanner unit 30 respectively. An image processing program of the present invention is stored in ROM 201.

PC 20 and scanner unit 30 are connected through communication units 207 and 306, and image data read by image reading unit 304 serving as reading section are fed into PC 20 through communication units 306 and 207 to be stored in HDD 203.

Impact detecting sensor 206 of PC 20 detects an impact received by HDD 203, while impact detecting sensor 305 of scanner unit 30 detects an impact received by image reading unit 304.

As has been described above, in image processing system 1 shown in FIG. 1 and image processing system 10 shown in FIG. 2, a reading operation of a document image is performed by the image reading unit and an image data obtained by reading the document image is stored in the HDD. In addition, "image processing system" is a concept which of course includes a system with individual units connected with each other, and also includes a single integral apparatus (image processing apparatus), for example the one with PC 20 and scanner unit 30 combined as shown in FIG. 3.

Meanwhile, a reception of an impact during a reading by the image reading unit can disturb the normal reading operation which results in a failed read image. The same is true for the case when an image is stored in an HDD. That is, a reception of an impact during a storing of an image in an HDD can disturb the normal execution of the storing operation, thus resulting in a failed stored image in the HDD. In consideration of this problem, a reading operation or the like may be stopped upon receiving an impact. However, such a stop temporarily suspends the reading operation, which may be undesirable from a productivity standpoint. Operations of an image processing system of the present invention will now be described below.

Figure 5:
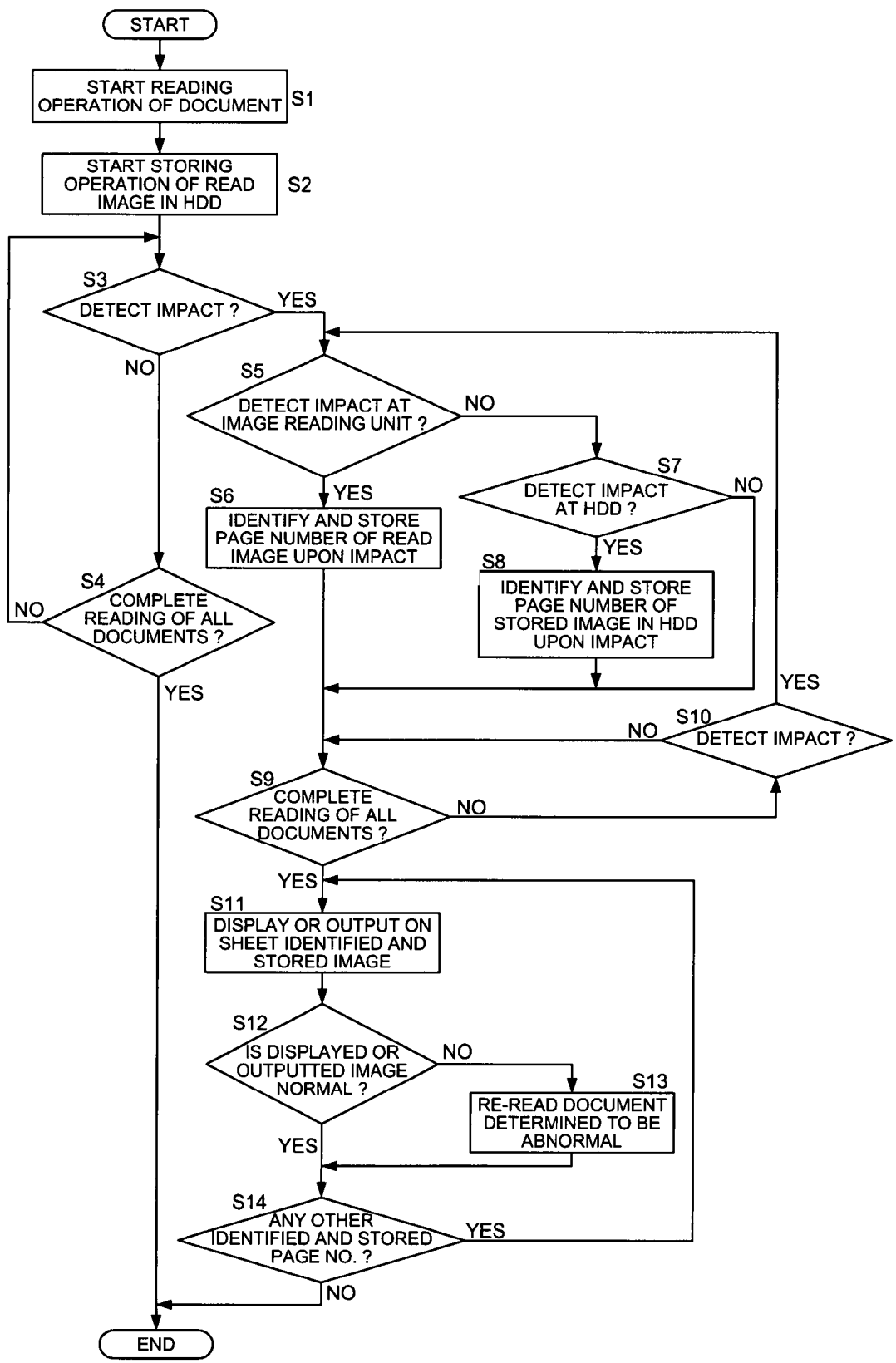
FIG. 5 is a flow chart illustrating an operation of the image processing systems when receiving an impact.

FIG. 5 is a flow chart illustrating an operation of an image processing system upon receiving an impact. To implement the operation according to this flow chart, CPU 100 reads a controlling program stored in ROM 101 into RAM 102 to execute it. In addition, this controlling program may be stored in HDD 103 before shipment. Even if not stored in HDD 103 before shipment, the program may alternatively be provided in the form of an external medium such as a CD-ROM or DVD-ROM, or a new version of the program may be provided in the form of an electric signal via NIC 104 and installed to HDD 103 to upgrade an old version of the program. In this case, the program provided in the form of an medium or electric signal may be one which deletes an old version of the controlling program from HDD 103 to install a new one or modifies a part of an old version of the controlling program to upgrade to a new version, as long as the controlling program stored in HDD 103 can implement the following operations.

First, a reading operation of a document image is started (step S1), followed by a start of a storing operation (step S2) which stores an image data obtained by reading the document image in the HDD. Next, it is determined whether or not an impact has been detected (step S3 serving as a detecting process). This detection is performed by the above-mentioned impact detecting sensor in the image processing system. The operation of detecting an impact continues until a reading of all documents is completed (steps S3 and S4).

If detecting an impact, it is determined whether or not the impact has been detected at the image reading unit (step S5). If the impact is determined to have been detected at the image reading unit, the page number of an image which was being read when the impact was received is recorded (step S6 serving as a document image identifying process). For example, in order to identify the page number, pages of image data read by the image reading unit can be counted with a counter to examine the counter value when detecting the impact.

If the impact is determined to have not been detected at the image reading unit, it is then determined whether or not the impact has been detected at the HDD (step S7). If the impact is determined to have been detected at the HDD, the page number of an image which was being stored when the impact was received is identified and recorded (step S8 serving as a document image identifying process), whereas if the impact is determined to have not been detected at the HDD, the page number identifying and storing operation as in steps S6 and S8 is not performed. In order to identify the page number of the image stored by the HDD, for example, pages of image data stored by the HDD can be counted with a counter to examine the counter value when detecting the impact in a similar manner as described in step S6.

The determination of whether or not an impact is received (step S10) continues until a reading of all documents is completed (step S9: No), during which, if detecting an impact, steps from S5 to S8 are repeated. Whereas, when the reading of all documents is completed (step S9: No), steps (from S11 to S14) are accessed to handle a case where impacts may cause failures in the reading operation by the image processing unit or the storing operation in the HDD.

Figure 6:
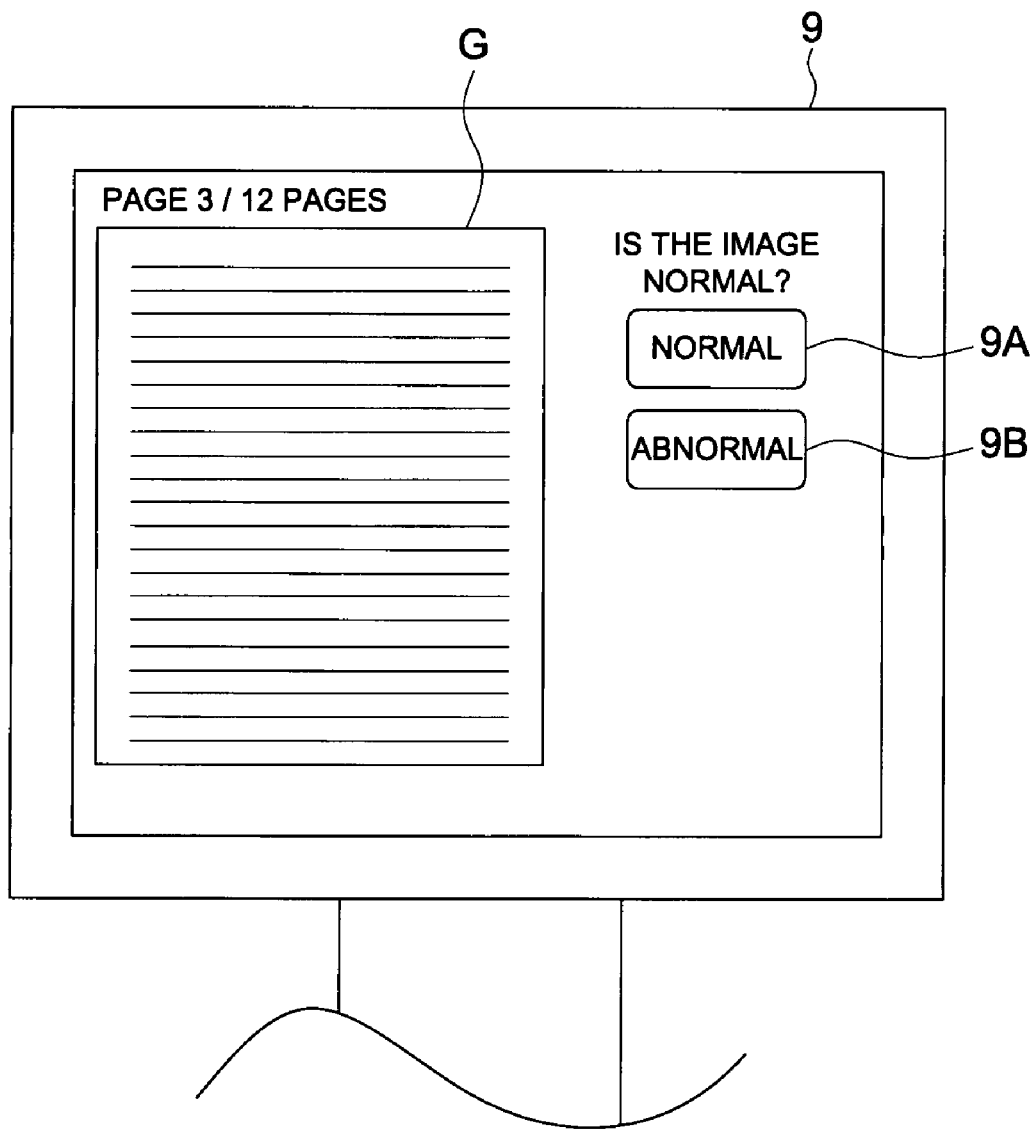
FIG. 6 illustrates operation display unit 9 which displays an image for a page number identified and stored in image processing system 1.

First, if there is an image which has been identified and stored, it is displayed or outputted on a sheet to visualize the image data (step S11 serving as an outputting process), thereby allowing a user to determine whether or not the image is normal (step S12). Specifically, in the case of image processing system 1 of FIG. 1, an image is displayed on operation display unit 9 or is formed on sheet S1 by image forming unit A1 to be outputted. In the case of image processing system 10 of FIG. 3, an image is displayed on display 20A of PC 20. FIG. 6 illustrates operation display unit 9 which displays an image for a page number identified and stored in image processing system 1. Image G is displayed on operation display unit 9 at a largest size to identify small characters. The page number preferably is also displayed on operation display unit 9. Displaying such a large image allows easy determination of the image normality. Also, an image on a sheet discharged onto the discharge tray may be examined to determine the image normality, the result of which is then inputted to operation display unit 9.

If a user examines image G displayed on operation display unit 9 and determines it is normal (step S12: Yes), the user presses "NORMAL" button 9A and then determines whether or not there remain other identified and stored pages (step S14). On the other hand, if a user examines image G displayed on operation display unit 9 and determines it is abnormal (step S12: No), the user presses "ABNORMAL" button 9B, which prompts, on operation display unit 9, the user to again set the document having the page number of the image determined by the user to be abnormal, so that a re-reading operation of the document is performed (step S13). The re-read image data is then stored in the HDD in place of the previously stored image data (a storing process). As a result, all the stored data become normal. If the re-reading operation is completed, it is determined whether or not there remain other identified and stored page numbers (step S14), and, if so, steps from S11 to S14 are repeatedly executed.

As has been described above, even when detecting an impact during a reading operation of the image processing unit or storing operation of the HDD, the reading or storing operation is continued, thus suppressing a decrease in productivity. In addition, after a reading operation of all documents is completed, an image data which may fail to be read or stored is visualized to be outputted to a user at operation display unit 9, etc. and, if it is determined to be abnormal, a reading or storing operation is performed again, thus enabling restoration of a failure upon receiving an impact.

Meanwhile, although, in the flow chart shown in FIG. 5, an impact is detected both in the reading and storing operations, the detection may be limited to either of the operations.

It is to be understood that the present invention is not limited to the embodiment described above, but may include any modification or addition without departing from the scope of the invention.

What is claimed is:

1. An image processing system comprising:
   a reading section which reads a document image to obtain an image data from a plurality of documents having been set;
   an impact detecting section to detect an impact received by the reading section, the impact detecting section comprising a piezoelectric device or an acceleration sensor;
   an identifying section which identifies an image data obtained by reading the document image using the reading section upon receiving an impact, when the impact is detected by the impact detecting section during a reading operation of the document image using the reading section;
   an outputting section which visualizes and outputs the image data identified by the identifying section for an operator; and
   a control section to control operations of the image processing system, wherein the control section controls the reading section to continue reading until completion of reading all the plurality of documents having been set, and controls the outputting section to output the identified image data after the completion of reading all the plurality of documents.

2. The image processing system of claim 1, wherein an outputting of the image data by the outputting section is a displaying of the visualized image based on the image data on a display unit.

3. The image processing system of claim 1, wherein an outputting of the image data by the outputting section is an outputting by forming the visualized image on a sheet based on the image data.

4. An image processing system comprising:
 a reading section which reads a document image to obtain an image data from a plurality of documents having been set;
 a storing section which stores the image data obtained;
 an impact detecting section to detect an impact received by the reading section, the impact detecting section comprising a piezoelectric device or an acceleration sensor;
 an identifying section which identifies an image data stored by the storing section upon receiving an impact, when the impact is detected by the impact detecting section during a storing operation of the image data using the storing section; and
 an outputting section which reads out from the storing section the image data identified by the identifying section, and visualizes the image data to output for an operator; and
 a control section to control operations of the image processing system, wherein the control section controls the reading section to continue reading until completion of reading all the plurality of documents having been set, and controls the outputting section to output the indentified image data after the completion of reading all the plurality of documents.

5. The image processing system of claim 4, wherein the control section controls such that, when the reading section has performed a re-reading operation of the document image corresponding to the identified image data to obtain an re-read image data, the storing section stores the re-read image data in place of the previously stored image data.

6. The image processing system of claim 4, wherein an outputting of the image data by the outputting section is a displaying of the visualized image based on the image data on a display unit.

7. The image processing system of claim 4, wherein an outputting of the image data by the outputting section is an outputting by forming the visualized image on a sheet based on the image data.

8. A non-transitory computer-readable storage medium having a program stored thereon for causing a computer to perform an image processing procedure for processing an abnormal operation generated in an image processing system which has a reading section to read a document image to obtain an image data from a plurality of documents having been set, an impact detecting section, comprising a piezoelectric device or an acceleration sensor, to detect an impact received by the reading section, and an outputting section to visualize and output the image data obtained by the reading section; the image processing procedure comprising the steps of:
 detecting the impact by the impact detecting section;
 identifying an image data obtained by reading the document image using the reading section upon receiving an impact, when the impact is detected by the impact detecting section during a reading operation of the document image using the reading section;
 outputting by the outputting section the image data identified by the identifying section: and
 controlling the reading section to continue reading until completion of reading all the plurality of documents having been set, and controlling the outputting section to output the identified image data after the completion of reading all the plurality of documents.

9. The non-transitory computer-readable storage medium of claim 8, wherein an outputting of the image data by the outputting section is a displaying of the visualized image based on the image data on a display unit.

10. The non-transitory computer-readable storage medium of claim 8, wherein an outputting of the image data by the outputting section is an outputting by forming the visualized image on a sheet based on the image data.

11. A non-transitory computer-readable storage medium having a program stored thereon for causing a computer to perform an image processing procedure for processing an abnormal operation generated in the image processing system which has a reading section to read a document image to obtain an image data from a plurality of documents having been set, a storing section to store the image data obtained, an impact detecting section, comprising a piezoelectric device or an acceleration sensor, to detect an impact received by the reading section, and an outputting section to visualize and output the image data obtained by the reading section; the image processing procedure comprising the steps of:
 detecting the impact by the impact detecting section;
 identifying an image data stored by the storing section upon receiving an impact, when the impact is detected by the impact detecting section during a storing operation of the image data using the storing section;
 outputting by the outputting section the image data identified by the identifying step: and
 controlling the reading section to continue reading until completion of reading all the plurality of documents having been set, and controlling the outputting section to output the identified image data after the completion of reading all the plurality of documents.

12. The non-transitory computer-readable storage medium of claim 11, wherein the image processing system further has a control section to control the storing section, and when the reading section has performed a re-reading operation of the document image corresponding to the identified image data to obtain a re-read image data, the program causes the computer to perform the image processing procedure so that the storing section stores the re-read image data in place of the previously stored image data.

13. The non-transitory computer-readable storage medium of claim 11, wherein an outputting of the image data by the outputting section is a displaying of the visualized image based on the image data on a display unit.

14. The non-transitory computer-readable storage medium of claim 11, wherein an outputting of the image data by the outputting section is an outputting by forming the visualized image on a sheet based on the image data.

15. An image processing method for processing an abnormal operation generated in an image processing system which has a reading section to read a document image to obtain an image data from a plurality of documents having been set, an impact detecting section, comprising a piezoelectric device or an acceleration sensor, to detect an impact received by the reading section, and an outputting section to visualize and output the image data obtained by the reading section; the image processing method comprising the steps of:
 detecting the impact by the impact detecting section;
 identifying an image data obtained by reading the document image using the reading section upon receiving an impact, when the impact is detected by the impact detecting section during a reading operation of the document image using the reading section;

outputting by the outputting section the image data identified by the identifying section; and controlling the reading section to continue reading until completion of reading all the plurality of documents having been set, and controlling the outputting section to output the identified image data after the completion of reading all the plurality of documents.

16. The image processing method of claim 15, wherein an outputting of the image data by the outputting section is a displaying of the visualized image based on the image data on a display unit.

17. The image processing method of claim 15, wherein an outputting of the image data by the outputting section is an outputting by forming the visualized image on a sheet based on the image data.

18. An image processing method for processing an abnormal operation generated in an image processing system which has a reading section to read a document image to obtain an image data from a plurality of documents having been set, a storing section to store the image data obtained, an impact detecting section, comprising a piezoelectric device or an acceleration sensor, to detect an impact received by the reading section, and an outputting section to visualize and output the image data obtained by the reading section; the image processing method comprising the steps of:

detecting the impact by the impact detecting section;

identifying an image data stored by the storing section upon receiving an impact, when the impact is detected by the impact detecting section during a storing operation of the image data using the storing section;

outputting by the outputting section the image data identified by the identifying step; and controlling the reading section to continue reading until completion of reading all the plurality of documents having been set, and controlling the outputting section to output the identified image data after the completion of reading all the plurality of documents.

19. The image processing method of claim 18, wherein the image processing system further has a control section to control the storing section, and the image processing method further comprises the step of storing a re-read image data in place of the previously stored image data, when the reading section has performed a re-reading operation of the document image corresponding to the identified image data to obtain the re-read image data.

20. The image processing method of claim 18, wherein an outputting of the image data by the outputting section is a displaying of the visualized image based on the image data on a display unit.

* * * * *